May 10, 1938.　　　　E. S. BISSELL　　　　2,117,134

OPTICAL INSTRUMENT

Filed March 27, 1936

EVERETT S. BISSELL
INVENTOR

BY *J. A. Ellestad*

ATTORNEY

Patented May 10, 1938

2,117,134

UNITED STATES PATENT OFFICE 2,117,134

OPTICAL INSTRUMENT

Everett S. Bissell, Irondequoit, N. Y., assignor to Bausch & Lomb Optical Company, Rochester, N. Y., a corporation of New York Application March 27, 1936, Serial No. 71,346

2 Claims. (Cl. 88—39)

The present invention relates to optical devices and more particularly to a combined magnifier and pair of dividers.

In examining drawings, maps or the like, it is frequently necessary to use a magnifier to bring out small details and it is also often essential to use dividers to scale off distances, compare sizes etc. Tourists and motorists, for example, have constant recourse to maps and, although the desirability of these instruments is frequently brought home to them, the fact that two small, separate devices are required, usually results in the omission of one or both of these articles.

One of the objects of the present invention is to provide a magnifier having a pair of dividers secured thereto. Another object is to provide a simple and efficient mounting for divider arms on a lens holding rim. A further object is to provide a simple, unitary article having a magnifier and a pair of dividers. These and other objects and advantages reside in certain novel features of construction, arrangement and combination of parts as will hereinafter be more fully set forth and pointed out in the appended claims.

Referring to the drawing.

Figure 1:
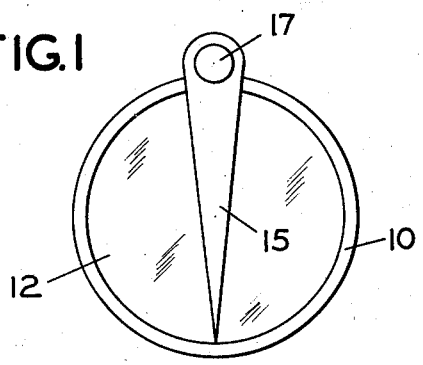
Fig. 1 is a front view of an article embodying this invention showing the divider arms in inoperative position.

One embodiment of the present invention is illustrated in the drawing wherein 10 indicates an annular rim having an internal groove 11 within which a lens 12 is fixedly mounted. A lug 13 formed on one side of the rim 10, carries a pin 14 which extends through the lug 13 parallel to the axis of the lens 12. Two divider arms 15 and 16 are pivotally mounted on the pin 14 on opposite sides of the lug 13 and concavo-convex caps 17 and 18 fixed on opposite ends of the pin 14, resiliently urge the arms and the lug into frictional contact.

Figure 2:
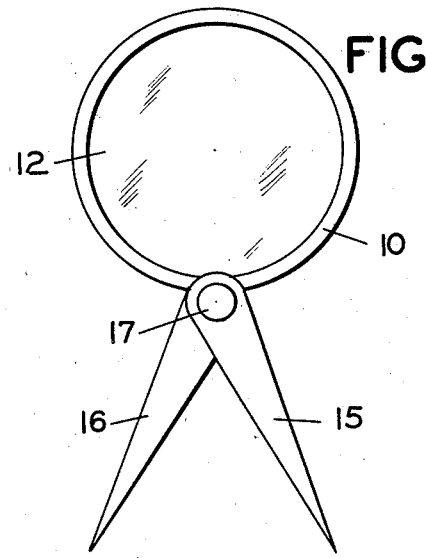
Fig. 2 is a similar view of same showing the divider arms in operative position.
Figure 3:
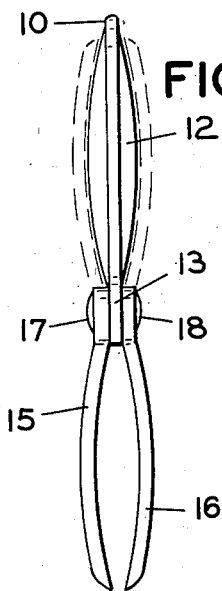
Fig. 3 is a side view of same.

When the combination of dividers and magnifier is not in use, the divider arms 15 and 16 are pivoted around so as to overlie the faces of the lens as shown in Fig. 1 and in the dotted position in Fig. 3. The operative position of the divider arms 15 and 16 is shown in Fig. 2 and in the full lines of Fig. 3.

Figure 5:
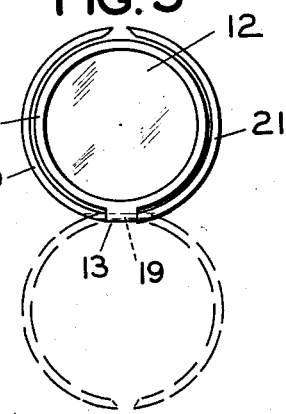
Fig. 5 is a front view of a modification.

In the modification shown in Fig. 5, the pin 19 extends through the lug 13 parallel to the plane of the rim 10. The divider arms 20 and 21 are pivotally mounted on the pin 19 on opposite sides of the lug 13 and are arcuately curved concentric with the rim 10. In this form, the arms 20 and 21 do not come in contact with the surface of the lens 12 and the danger of scratching the lens surfaces is eliminated. The full lines show the divider arms 20 and 21 in inoperative position while the dotted lines show the operative position of the arms.

Figure 6:
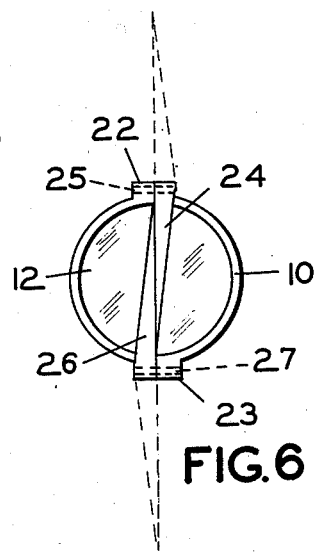
Fig. 6 is a front view of a further modification.
Figure 4:
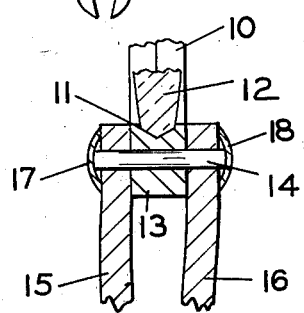
Fig. 4 is a fragmentary section of the hinge joint of the divider arms.

In the modification shown in Fig. 6 the rim 10 has two lugs 22 and 23 on opposite sides of the lens 12. One divider arm 24 is pivoted on a pin 25 in the lug 22 while the other divider arm 26 is pivoted on a pin 27 in the lug 23. The full lines show the divider arms 24 and 26 in their inoperative or closed position while the dotted lines show the arms in fully extended position. In this modification the arms 24 and 26 are pivoted on opposite sides of the lens 12 on axes perpendicular to the lens axis and hence the position of the arms on a chart or drawing can be observed through the lens.

From the foregoing it will be apparent that I am able to attain the objects of my invention and provide a unitary structure in which a magnifier and a pair of dividers are combined in a simple and efficient manner. Various modifications can, of course, be made without departing from the spirit of my invention or the scope of the appended claims.

I claim:

1. An article of the class described comprising an annular rim, a lens mounted within said rim, a pin extending through one edge of said rim parallel to the axis of said lens, a pair of divider arms independently rotatably mounted on said pin, one on each side of said lens, said divider arms being rotatable across the lens so that in inoperative position they serve to protect the lens surface, and resilient means for holding said arms and rim in frictional contact.

2. A combined magnifier and divider comprising an annular rim, a lens mounted within said rim, a pin extending through one edge of said rim parallel to the axis of said lens, a pair of divider pointed arms independently rotatably mounted on said pin, one on each side of said lens, said divider arms being curved to lie close against the faces of the lens to protect the lens and being shorter than the diameter of the rim so that the rim extends beyond the pointed ends of the arms, and resilient means for holding said arms and rim in frictional engagement.

EVERETT S. BISSELL.